United States Patent
Yi et al.

(10) Patent No.: US 11,809,557 B2
(45) Date of Patent: Nov. 7, 2023

(54) MOBILE MALICIOUS CODE CLASSIFICATION METHOD BASED ON FEATURE SELECTION AND RECORDING MEDIUM AND DEVICE FOR PERFORMING THE SAME

(71) Applicant: Foundation of Soongsil University-Industry Cooperation, Seoul (KR)

(72) Inventors: Jeong Hyun Yi, Seoul (KR); Eun Byeol Ko, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 395 days.

(21) Appl. No.: 17/296,892

(22) PCT Filed: Jan. 29, 2021

(86) PCT No.: PCT/KR2021/001194
§ 371 (c)(1),
(2) Date: May 25, 2021

(87) PCT Pub. No.: WO2022/114392
PCT Pub. Date: Jun. 2, 2022

(65) Prior Publication Data
US 2022/0179955 A1    Jun. 9, 2022

(30) Foreign Application Priority Data
Nov. 26, 2020  (KR) .................. 10-2020-0161669

(51) Int. Cl.
*G06F 21/56*    (2013.01)
*G06N 3/08*    (2023.01)

(52) U.S. Cl.
CPC ............ *G06F 21/562* (2013.01); *G06N 3/08* (2013.01); *G06F 2221/033* (2013.01)

(58) Field of Classification Search
None
See application file for complete search history.

(56) References Cited

U.S. PATENT DOCUMENTS

2018/0211140 A1*   7/2018  Davis .................... G06F 21/561

FOREIGN PATENT DOCUMENTS

KR    10-2012-0093564 A    8/2012
KR       10-1589656 B1    1/2016
(Continued)

OTHER PUBLICATIONS

Sherin Mary Mathews "Explainable Artificial Intelligence Applications in NLP, Biomedical, and Malware Classification: A Literature Review" CompCom 2019, pp. 1269-1292, AISC 998, McAfee LLC, Santa Clara, USA.

*Primary Examiner* — Cai Y Chen
(74) *Attorney, Agent, or Firm* — Stein IP, LLC

(57) ABSTRACT

A mobile malicious code classification method based on feature selection includes extracting Application Programming Interface (API) feature information including a package name, a class name, a method name and a description from a malicious application of a predefined category, vectorizing a training dataset generated using the package name, the class name and the method name in the API feature information for deep learning, learning the vectorized training dataset to generate a classifier, probabilistically classifying to fit a target malicious application into a category, and defining the category of the target malicious application using a result of the classification and outputting a classification important API. Accordingly, it is possible to deal with malicious behaviors of malicious applications (Continued)

quickly and prevent damage caused by the malicious behaviors.

9 Claims, 9 Drawing Sheets

(56) References Cited

FOREIGN PATENT DOCUMENTS

| KR | 10-2019-0102451 A | 9/2019 |
| KR | 10-2033354 B1 | 10/2019 |
| KR | 10-2090423 B1 | 5/2020 |
| KR | 10-2020-0073822 A | 6/2020 |

* cited by examiner

FIG. 4

Extracted API

$M_1$ app 1 : [ Lorg/json/JSONObject;, Lcom/airpush/android/PushAds;, ... ]
$M_1$ app 2 : [ Landroid/preference/PreferenceActivity;, ... ]

. . .

$M_t$ app 1 : [ Lorg/telephony/TelephonyManager;, Ljava/Lang/StringBuffer;, ... ]
$M_t$ app 2 : [ Lcom/lang/StringBuffer;, Landroid/database/Cursor;, ... ]

. . .

$M_{71}$ app n : [ Lorg/json/JSONObject;, Landroid/database/Cursor;, ... ]

Dictionary Generation

0 : Lorg/json/JSONObject
1 : Landroid/preference/PreferenceActivity
2 : Lcom/airpush/android/PushAds
3 : Lorg/telephony/TelephonyManager
4 : Lcom/lang/StringBuffer

. . .

1,273,249 : padding
1,273,250 : Unknown word

Vectorized API ( 1 x 7772 )

$M_1$ application 1 : [ 0, 2, 756, ..., 16852, 5592, 1273249 ]
$M_1$ application 2 : [ 1, 6768, ..., 8852, 456, 248, 1273249, ..., 1273249 ]

. . .

$M_t$ application 1 : [ 3, 4, ..., 3127, 34, 1273249, 1273249, 1273249 ]
$M_t$ application 2 : [ 4, 785, ..., 34, 187, 5556, 12557 ]

. . .

$M_{71}$ application n : [ 168, 785, ..., 1672, 459, 1538, 668, ..., 1273249 ]

Dense Vectorized API ( 1 x 7772 x 64 )

$M_1$ application 1 : [ [ 0, 015684, 0.0069851, -0.002347, 0.257162, 0.05186421, ... ],
[ -0.068541, 0.392268, -0.159822, 0.03545881, ... ], [ ... ], ... ]

. . .

$M_t$ application 1 : [ [ 0.025585, 0.081521, 0.1123471, -0.0566213, 0.357911, ... ],
[ 0.015973, 0.00258151, 0.00258151, 0.00258151, ... ], [ ... ], ... ]

. . .

$M_{71}$ application n : [ [ 0.015753, -0.051511, -0.1631221, 0.257162, 0.24298, ... ],
[ 0.0349249, 0.338329, -0.12340708, 0.00258151, ... ], [ ... ], ... ]

MOBILE MALICIOUS CODE CLASSIFICATION METHOD BASED ON FEATURE SELECTION AND RECORDING MEDIUM AND DEVICE FOR PERFORMING THE SAME

TECHNICAL FIELD

The present disclosure relates to a mobile malicious code classification method based on feature selection and a recording medium and a device for performing the same, and more particularly, to technology that detects a malicious application using deep learning based on Application Programming Interface (API) used to implement application functions and classifies the corresponding malicious application for each behavior.

BACKGROUND ART

In the era of massive Internet of Things (IoT) featuring a combination of IoT technology and 5G technology, as the number of connected devices increases, the amount of created and shared data will also increase. IDC predicts that by 2025, there will be 55.9 billion connected devices worldwide, and estimates data generated from connected IoT devices to be 79.4 ZB by 2025.

With the growth of devices and data, it is expected that 9 billion of these connected devices will be smartphones by 2024, so the impacts of mobile devices are increasing and the mobile application markets are growing. Also, the amount of mobile malicious code is increasing.

Android, which has the largest share in the application market, is based on its open market policy, and it is easy for anyone to copy, modify and distribute in an illegal and unauthorized manner. Thus, Android malicious code occupies the highest percentage of malicious code. Attackers insert malicious behavior code into applications and redistribute it using the open market policy, causing damage such as personal information leakage or financial losses to users. Accordingly, it is necessary to block malicious behaviors by detecting Android malicious applications accurately and rapidly.

Additionally, since attackers distribute malicious applications with different intentions, each malicious behavior and its countermeasure differ. To quickly deal with malicious applications increasing at faster rate, it is necessary to detect malicious applications for each behavior, not simply detect malicious applications.

Earlier studies use permission, description, and user review to detect malicious applications. However, these methods have clear limitations to detect applications for each actual behavior. Accordingly, there have been many studies based on Application Programming Interface (API) to detect the actual behaviors of applications.

However, all the above-mentioned approaches only classify an application as malicious and benign, and lacks a description of malicious behaviors. To inform users of damage that may be caused by functions, it is necessary to provide details of malicious behaviors using APIs describing the actual functional features.

Along with this, many studies have been made on category classification of malicious applications. However, they do not provide elaborate category classification, or they need an Antivirus scanning report. Accordingly, it is necessary to directly extract APIs from applications and classify categories elaborately according to functions using only the applications.

An Antivirus scanning report is provided by an Anti-Virus Vendor, and category names classified for each Vendor are different, causing ambiguity, and in some case of new malicious applications, Anti-Virus Vendors fail to detect them as being malicious.

RELATED LITERATURES

Patent Literatures (Patent Literature 1) KR 10-2090423 B1
(Patent Literature 2) KR 10-1589656 B1
(Patent Literature 3) KR 10-2020-0073822 A

DISCLOSURE

Technical Problem

In view of this circumstance, the present disclosure is directed to providing a mobile malicious code classification method based on feature selection.

The present disclosure is further directed to providing a recording medium having recorded thereon a computer program for performing the mobile malicious code classification method based on feature selection.

The present disclosure is further directed to providing a device for performing the mobile malicious code classification method based on feature selection.

Technical Solution

To achieve the above-described object of the present disclosure, a mobile malicious code classification method based on feature selection according to an embodiment includes extracting Application Programming Interface (API) feature information including a package name, a class name, a method name and a description from a malicious application of a predefined category, vectorizing a training dataset generated using the package name, the class name and the method name in the API feature information for deep learning, learning the vectorized training dataset to generate a classifier, probabilistically classifying to fit a target malicious application into a category, and defining the category of the target malicious application using a result of the classification and outputting a classification important API.

In an embodiment of the present disclosure, the vectorizing may include building the training dataset with APIs extracted from each application for each category, and vectorizing the APIs to use the training dataset as an input value of a deep learning algorithm.

In an embodiment of the present disclosure, the classifying may include assigning a probability for each category to fit the target malicious application into a category.

In an embodiment of the present disclosure, outputting the classification important API may include determining a category corresponding to a value that is larger than a preset threshold among probabilities for each category of the target malicious application as a feature of the target malicious application, and outputting a preset number of APIs having a greatest influence when the target malicious application is assigned with the probabilities by the classifier.

To achieve another object of the present disclosure, a computer-readable storage medium according to an embodiment has recorded thereon a computer program for performing the mobile malicious code classification method based on feature selection.

To achieve still another object of the present disclosure, a mobile malicious code classification device based on feature selection according to an embodiment includes an API extractor to extract API feature information including a package name, a class name, a method name and a description from a malicious application of a predefined category, an API vectorizer to vectorize a training dataset generated using the package name, the class name and the method name in the API feature information for deep learning, a learner to learn the vectorized training dataset to generate a classifier, a classifier to probabilistically classify to fit a target malicious application into a category, and a feature identifier to define a category of the target malicious application using a result of the classification and output a classification important API.

In an embodiment of the present disclosure, the API vectorizer may include a training dataset generator to build the training dataset with APIs extracted from each application for each category, and an API word embedding to vectorize the APIs to use the training dataset as an input value of a deep learning algorithm.

In an embodiment of the present disclosure, the classifier may include a probability evaluator to assign the probabilities for each category to fit the target malicious application into a category.

In an embodiment of the present disclosure, the feature identifier includes a decision maker to determine, as a feature of the target malicious application, a category corresponding to a value that is larger than a preset threshold among probabilities for each category of the target malicious application, and an important API identifier to output a preset number of APIs having a greatest influence when the target malicious application is assigned with the probabilities by the classifier.

Advantageous Effects

According to the mobile malicious code classification method based on feature selection, it is possible to classify the categories of malicious applications and obtain important Application Programming Interfaces (APIs) using a deep learning algorithm after identifying the actual behaviors of the malicious applications using APIs responsible for actual functions of applications. Accordingly, it is possible to identify the detailed features of the malicious applications, and it is expected to deal with the malicious behaviors quickly using them and prevent damage caused by the malicious behaviors.

DESCRIPTION OF DRAWINGS

FIG. 4 is a diagram showing an example of conversion into a dense vector.

BEST MODE

Figure 1:
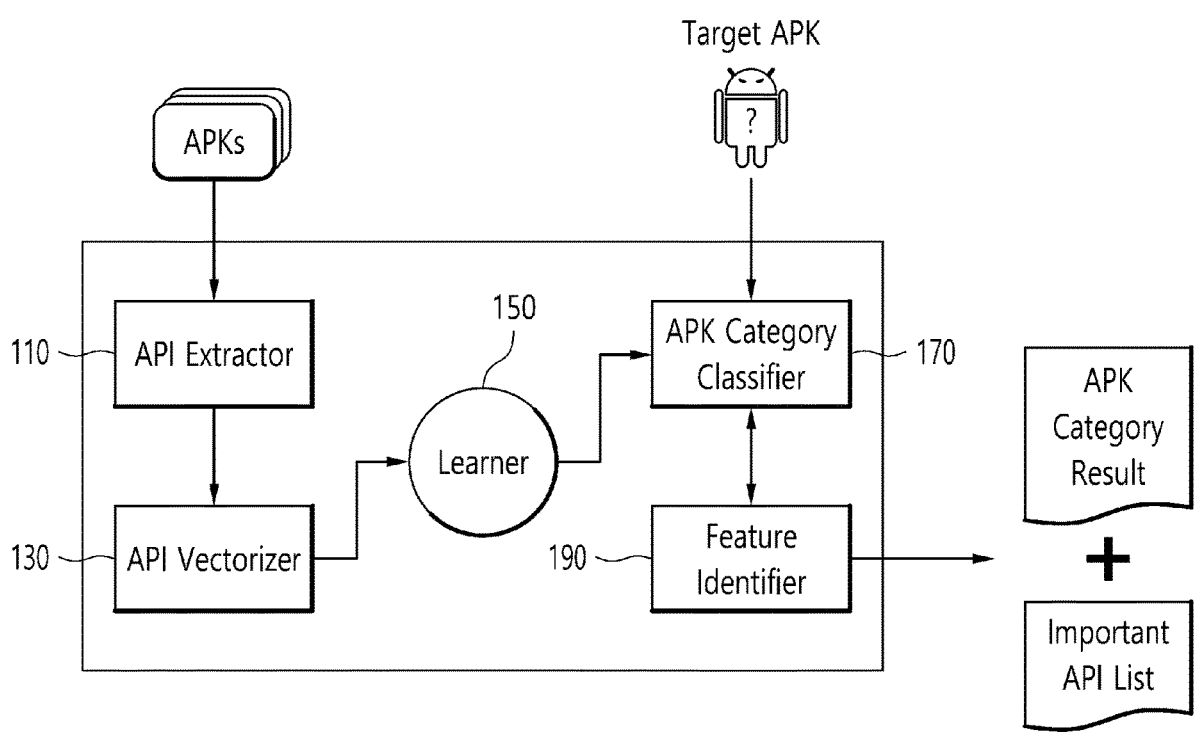
FIG. 1 is a block diagram of a mobile malicious code classification device based on feature selection according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be embodied in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, the preferred embodiments of the present disclosure will be described in more detail with reference to the accompanying drawings.

Figure 2:
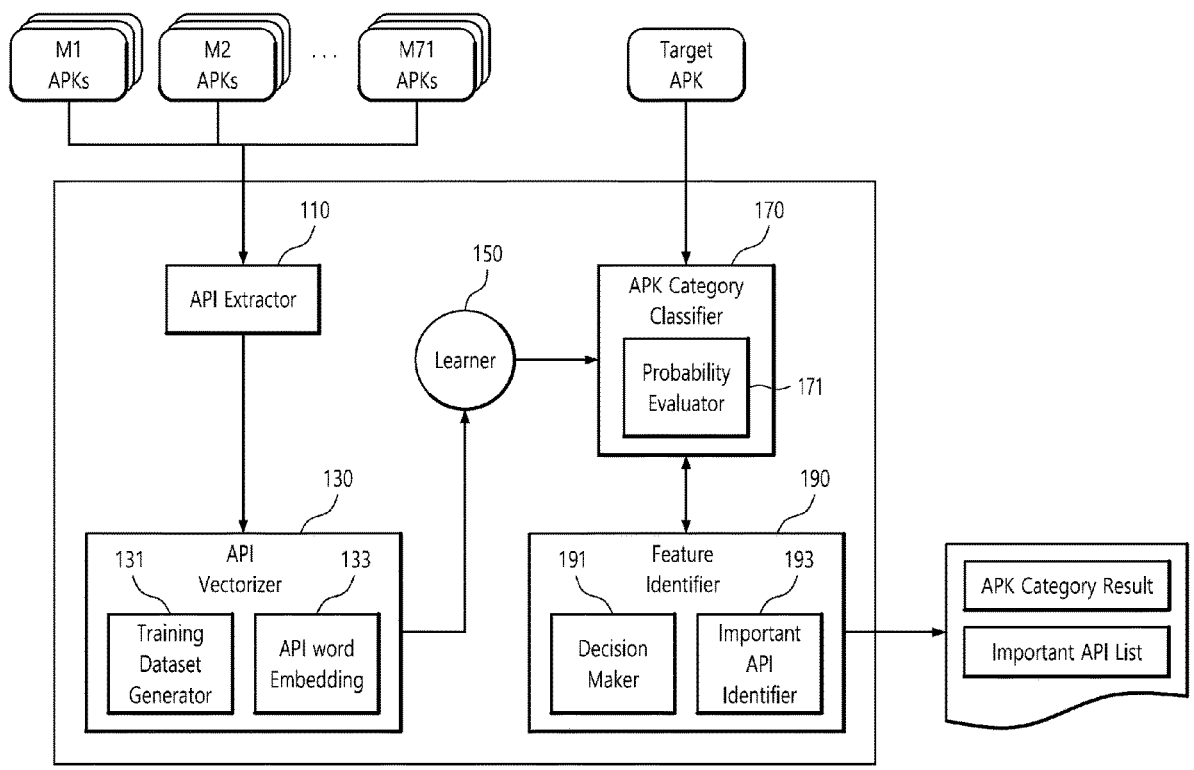
FIG. 2 is a detailed configuration diagram of the mobile malicious code classification device of FIG. 1.

FIG. 1 is a block diagram of a mobile malicious code classification device based on feature selection according to an embodiment of the present disclosure. FIG. 2 is a detailed configuration diagram of the mobile malicious code classification device of FIG. 1.

The mobile malicious code classification device 10 based on feature selection (hereinafter, the device) according to the present disclosure detects features of malicious applications based on APIs of applications.

API is the acronym of Application Programming Interface and describes actual functional features of applications, which makes it possible to classify based on actual behaviors. Additionally, it is possible to extract using only applications without reliance on vaccine programs, thereby increasing the range of classifiable applications.

Additionally, it is not only possible to classify malicious and benign but also provide information about behaviors of applications by providing 71 categories together with APIs that significantly affect classification.

For malicious application feature detection based on API, API feature information used in malicious applications of predefined categories is extracted. A training dataset is built with package name, class name and method name in the extracted API feature information.

Subsequently, the training dataset is vectorized for input to a deep learning algorithm and inputted to the deep learning algorithm to perform learning. After the learning is completed, important APIs are identified using a visualization algorithm such as Local Interpretable Model-Agnostic Explanation (LIME), and provided to a classifier together with the classification result.

Referring to FIG. 1, the device 10 according to the present disclosure includes an API extractor 110, an API vectorizer 130, a learner 150, a classifier 170 and a feature identifier 190.

The device 10 of the present disclosure may run software (application) for performing mobile malicious code classification based on feature selection installed thereon, and the API extractor 110, the API vectorizer 130, the learner 150, the classifier 170 and the feature identifier 190 may be controlled by the software for performing mobile malicious code classification based on feature selection, running on the device 10.

The device 10 may be a separate terminal or modules of the terminal. Additionally, the API extractor 110, the API vectorizer 130, the learner 150, the classifier 170 and the feature identifier 190 may be formed as an integrated module or at least one module. However, to the contrary, each element may be formed as a separate module.

The device 10 may be mobile or fixed. The device 10 may be in the form of a server or an engine, and may be interchangeably used with a device, an apparatus, a terminal, user equipment (UE), a mobile station (MS), a wireless device and a handheld device.

The device 10 may execute or create a variety of software based on an Operation System (OS), namely, a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX, and HP-UX.

The API extractor 110 extracts API feature information including a package name, a class name, a method name and a description from a malicious application of a predefined category.

Figure 3:
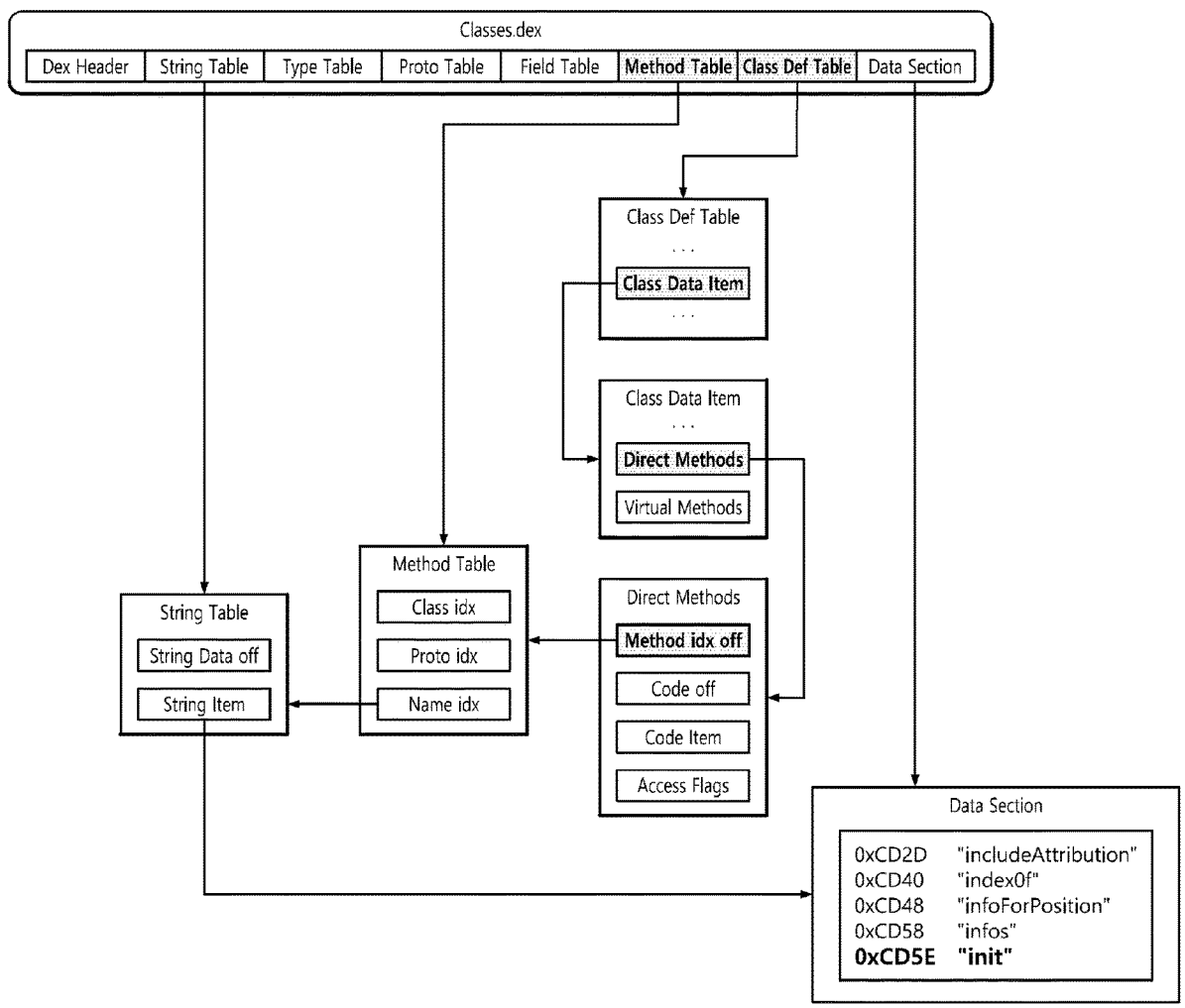
FIG. 3 is a diagram showing an example of an Application Programming Interface (API) extraction process of AndroGuard.

The API extractor 110 may extract API using the static analysis technique. The present disclosure uses the application AndroGuard tool to extract API. An example of extracting API with AndroGuard is shown in FIG. 3.

First, a classes.dex file including the substantial code of an application is analyzed by parsing. In 8 DEX file fields, Method Table and Class Def Table include data related to method. First, Method Table contains all method names used in the application, namely, a user defined method and a framework API. Additionally, a class including the framework API is not defined in the DEX file and is implemented in an Android device, so Class Def Table only has a user-defined class list.

In Class Data Item within Class Def Table, Direct Methods and Virtual Methods contain information of method for each class. In particular, Direct Methods contain offset of method pointing into index of Method Table. When going to String Table using Name index value of Method Table, API in Data Section can be found and extracted.

An example of API feature information that may be acquired by extraction is shown in the following Table 1.

TABLE 1

| | |
|---|---|
| Package name | android.telephony |
| Class name | SmsManager |
| Method name | sendDataMessage |
| Description | Send a data based SMS to a specific application port. |

In the API feature information, the description has many words, which may increase the dimension, and except the description, the package name, the class name and the method name representing API in sufficiently detail are used to build a training set and a test set.

The API vectorizer 130 vectorizes the training dataset generated using the package name, the class name and the method name in the API feature information for deep learning.

The API vectorizer 130 may include a training dataset generator 131 to build a training dataset with APIs extracted from each application for each category, and an API word embedding 133 to vectorize the APIs to use the training dataset as an input value of a deep learning algorithm.

After extracting the APIs and building the training dataset, Deep Learner vectorizes the training dataset. To learn via a convolutional neural network (CNN), numeric data, not natural language, is necessary. Subsequently, learning is performed through the CNN algorithm using the vectorized data.

In the learning, a feature map is extracted through convolution computation by a filter to a value of data, so a normally used language cannot be used as training data. Accordingly, vectorization (word embedding) of API features is necessary.

In an embodiment, for vectorization, the present disclosure uses Tokenize including conversion of words in APIs into dictionary and integer mapping to map the words to number. The present disclosure uses dictionary including the total of 1,273,251 lists, with an addition of padding for adjusting the size of the vector and Unknown API to work on applications not used in learning.

In case of simply mapping to numbers, it is high-dimensional and there is no description of a relationship between APIs used, and thus a vector value is controlled using the embedding layer. For input to the embedding layer, the size of the API vector of each application is adjusted using padding.

The present disclosure uses AMD dataset, and in this instance, the API information vector size of each application is adjusted to 1×7772. Subsequently, learning is performed using the embedding layer to convert into a dense vector that can contain a large amount of information compared to small dimensions.

The present disclosure sets the size of the dense vector to 64. The detailed conversion is shown in FIG. 4.

The learner 150 generates a classifier by learning the vectorized training dataset.

When the vectorization is completed, learning is performed using the CNN algorithm. The learning is performed at two stages: learning using the total benign and malicious application data, and learning using malicious applications of predefined categories. In the learning, the present disclosure performs convolution computation using Conv1D layer commonly used in Text-CNN.

When a filter used in computation is set to 8, the filter dimension (embedding dimension) is 8 and the filter size is (64, 8), and the number of filters is set to 32. Padding and stride use a basic value, padding 0 and stride 1, and as the filter length is set to 8 and the number of filters is set to 32, the feature map size is (7765,32).

Figure 5:
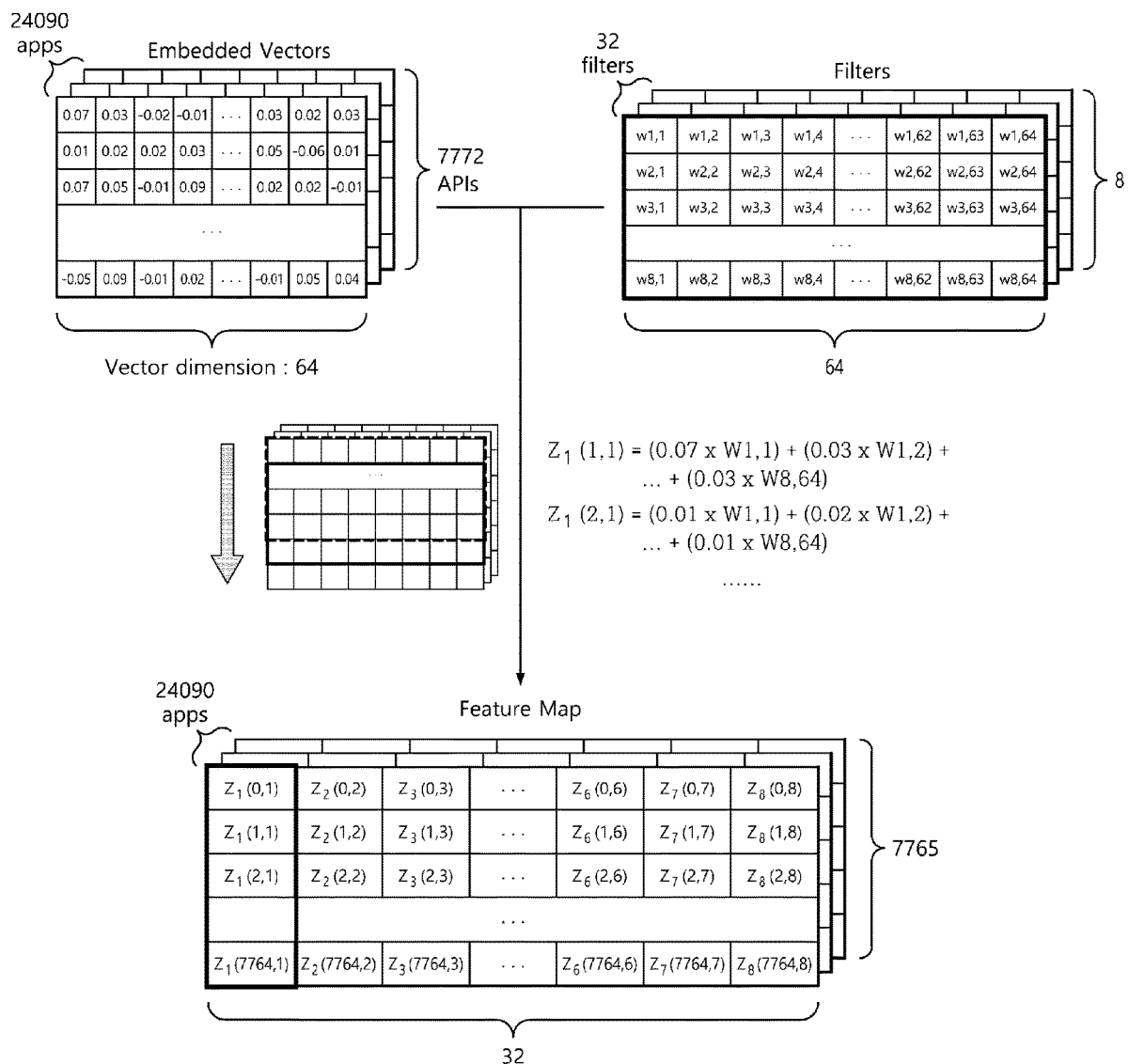
FIG. 5 is a diagram showing an example of training a convolutional neural network (CNN) using AMD dataset.

When the filters are applied to data, a feature map is extracted for each filter. In this instance, when the feature map is z, the $(x, y)^{th}$ value is represented as $Z(x, y)$. Since the present disclosure trains CNN using AMD dataset, 24090 applications are used as can be seen in FIG. 5. The data and the filters are shown in FIG. 5.

An activation function is applied to the feature map created through the above process. In an embodiment of the present disclosure, ReLU function may be used as the activation function. As its advantage is relatively fast learning and a low computation cost, the ReLU function is one of the most frequently used activation functions.

Subsequently, the generated matrix is called an Activation Map. The largest vector is chosen from feature vectors across APIs using the Activation Map and max pooling. The most discriminative feature is chosen from APIs used in applications.

Figure 6:
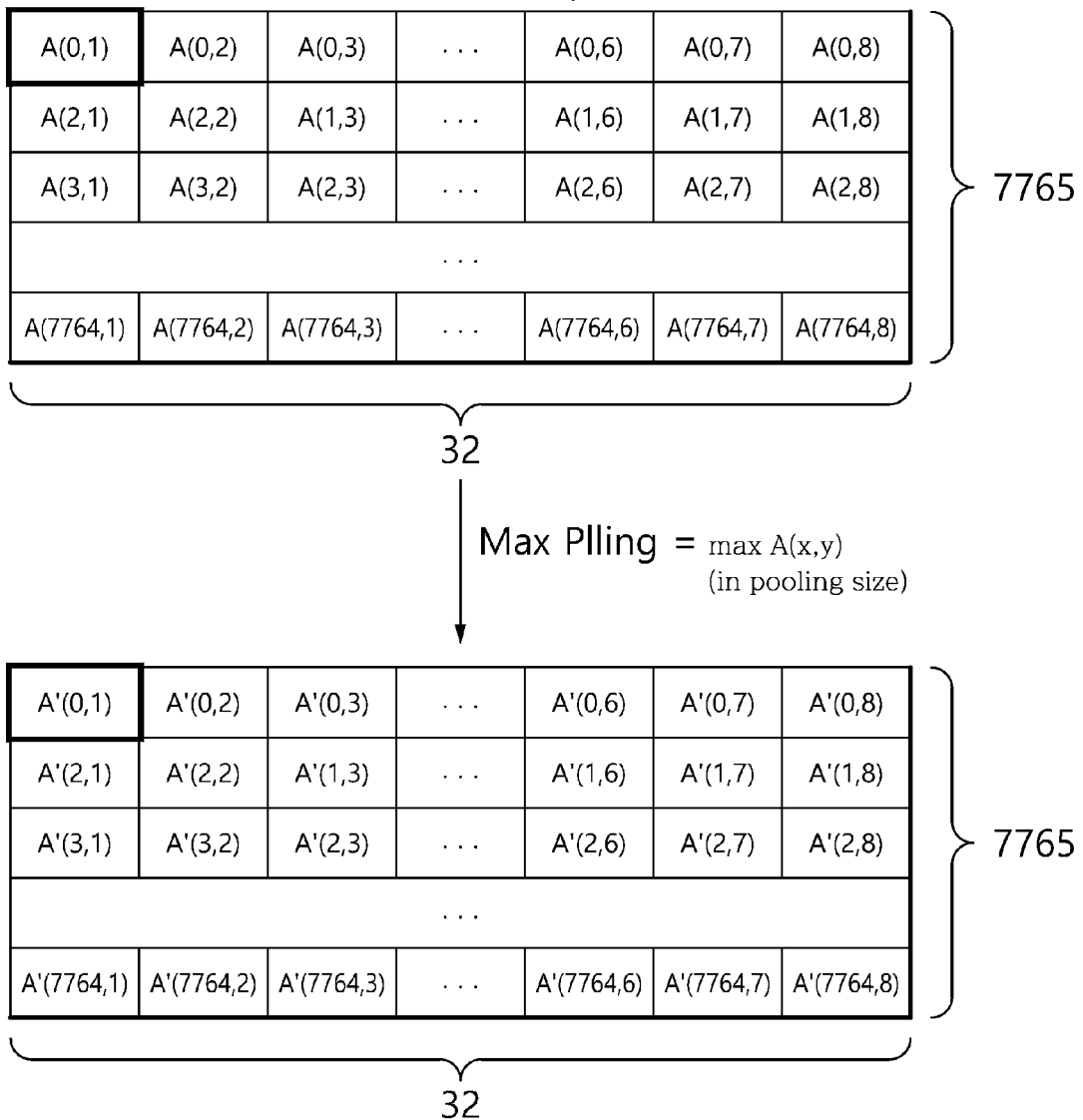
FIG. 6 is a diagram showing an example of outputting category probabilities.

In an embodiment of the present disclosure, the size of pooling is set to 1. The result value gone through a pooling layer is converted into a 1-dimensional vector and connected to a fully connected neural network. Subsequently, a category probability is outputted using softmax function to normalize all outputs between 0 and 1. This process is shown in FIG. 6. In FIG. 6, A(x, y) denotes a value after applying the ReLU function to Z(x, y).

Figure 7:
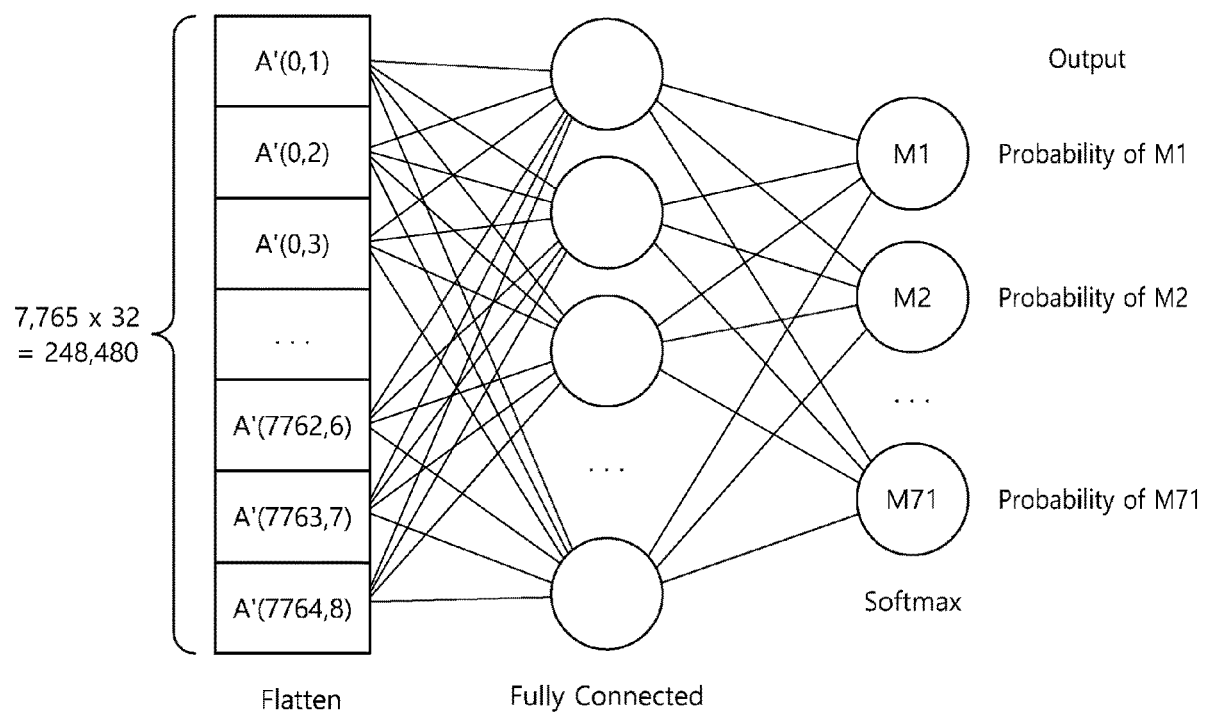
FIG. 7 is a diagram showing an example of learning after converting a result value matrix gone through pooling into a vector and connecting to a fully connected neural network.

When the pooling is completed, the result value matrix is converted into a vector and connected to a fully connected neural network, and then learning is performed. The process is shown in FIG. 7.

The classifier 170 probabilistically classifies to fit a target malicious application into a category.

The classifier 170 may include a probability evaluator 171 to assign a probability for each category to fit the target malicious application into a category.

A malicious application is detected using classifiers built after the learning and LIME algorithm, the category of the corresponding malicious application is classified, and then important features are extracted and provided.

The present disclosure stores the API vectorized as the training data and the CNN model trained through the CNN algorithm and uses as a classifier. A target application is classified as malicious or benign when a malicious application is detected by a risk classifier trained using benign applications and malicious applications. Subsequently, when the target application is classified as a malicious application, a probability vector is outputted from a category classifier for each category. The following Table 2 shows some of the results outputted from the classifiers.

TABLE 2

| Application | M1 probability | M2 probability | M3 probability | ... | M70 probability | M71 probability |
|---|---|---|---|---|---|---|
| 1 | 0.12 | 0.10 | 0.03 | ... | 0.05 | 0.16 |
| 2 | 0.02 | 0.01 | 0.78 | | 0.01 | 0.01 |
| ... | | | ... | | | |

When determining a category, since there are 71 categories, in case that more elaborate categorization is necessary or malicious applications are of other categories than 71 categories, the probability result value may be ambiguous. Accordingly, the present disclosure gives Unlabeled to the target application having a component of a result vector not higher than a threshold (for example, 0.5) on the basis of 50%, and provides similar categories and important features together.

Figure 8:
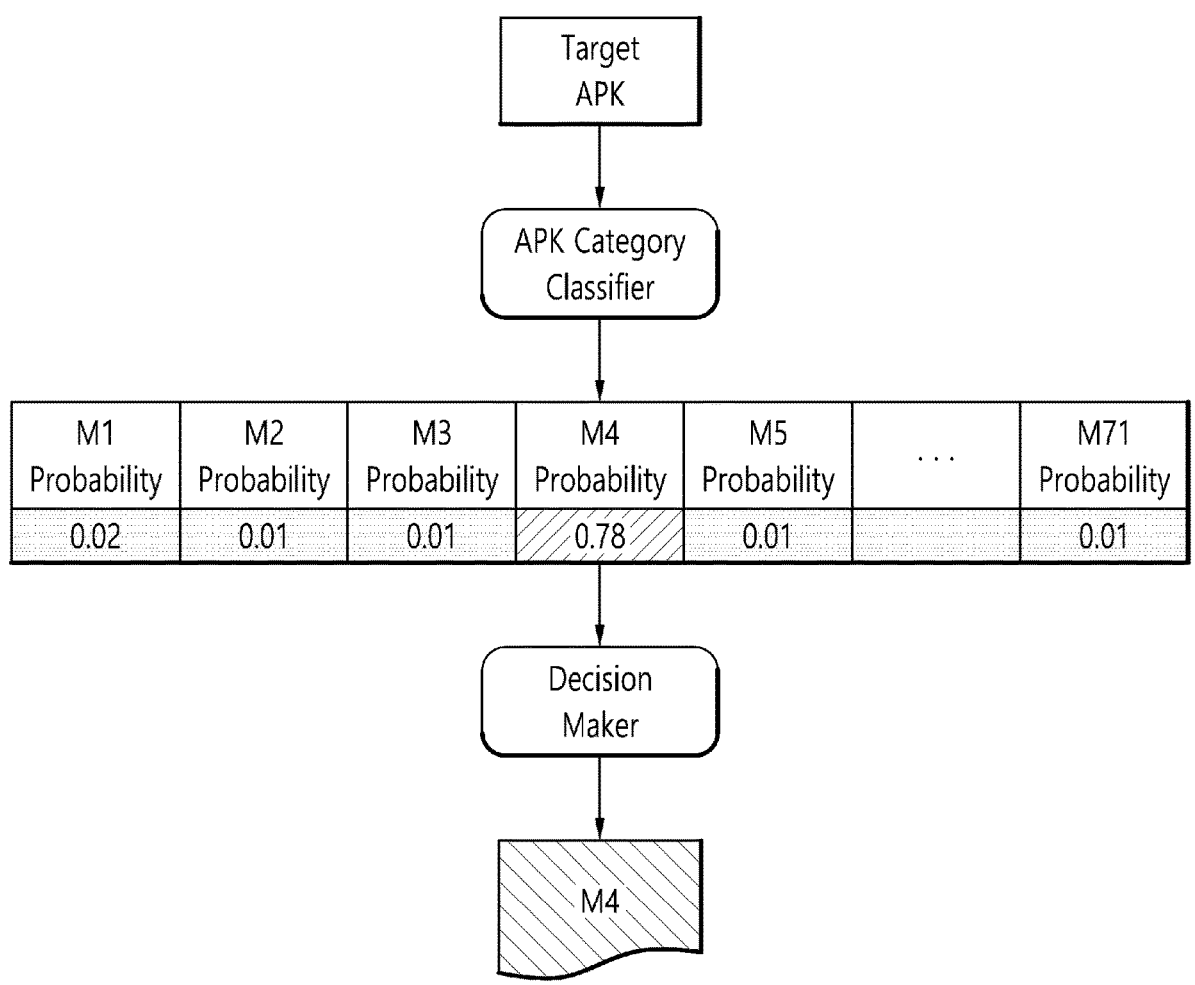
FIG. 8 is a diagram showing an example of a decision maker determining a scope of malicious applications.

FIG. 8 is a diagram showing an example of the decision maker determining a scope of malicious applications.

The feature identifier 190 defines the category of the target malicious application using the classification result and outputs a classification important API.

The feature identifier 190 may include a decision maker 191 to determine, as the feature of the target malicious application, a category corresponding to a value that is larger than a preset threshold among probabilities for each category of the target malicious application, and an important API identifier 193 to output a preset number of APIs having the greatest influence when the target malicious application is assigned with the probabilities by the classifier.

When the target application is inputted to the trained CNN model using the LIME algorithm, the decision basis is provided. First, when the target application is inputted to the category classifier and decision is completed, to find an important API, LIME converts the input features to generate many similar input values. Additionally, important features are determined based on the decision output to the converted similar input values input to the category classifier.

The present disclosure is aimed at identifying behaviors of applications to some extent from the result of 10 important APIs even though there is no label. The following Table 3 shows the important API output result for the application classified as unlabeled.

TABLE 3

| Important API |
|---|
| Landroid/app/NotificationManager; |
| Ljava/lang/String; |
| Ljava/lang/IllegalArgumentException; |
| Lorg/apache/http/params/HttpConnectionParams; |
| Landroid/os/Bundle; |
| Landroid/widget/ListView; |
| Ljava/lang/Runtime; |
| Ljava/util/Iterator; |
| Landroid/os/Environment; |
| Landroid/os/Messenger; |

With the growth of the Android application market, there is a rapid increase in malicious applications targeting vulnerabilities of Android that is easy to modify and redistribute. Accordingly, damage caused by malicious applications is increasing. To prevent this situation, it is necessary to block malicious behaviors by analyzing malicious applications quickly. Additionally, it is necessary to accurately and quickly make decisions based on features associated with actual behaviors of applications.

The existing application detection approaches simply have classified malicious applications and benign applications and then detected. However, if the behaviors of the malicious applications are detected together, it will be possible to deal with the malicious applications more quickly.

Accordingly, the present disclosure proposes a category classification approach of malicious applications using APIs deeply associated with actual behaviors as features. Additionally, CNN which is a deep learning algorithm having objectivity since humans do not select features is used for more objective and accurate classification, and to overcome the blackbox model regarded as the disadvantage of deep learning, important features as the decision criteria are provided together using the LIME algorithm to allow users themselves to make decisions.

Although the present disclosure classifies into 71 categories using AMD dataset of predefined category as training data for map learning, it is expected that utility will be higher when the present disclosure is applied by creating new criteria through further analysis of malicious applications to be used as training data and classifying into more elaborate categories.

Figure 9:
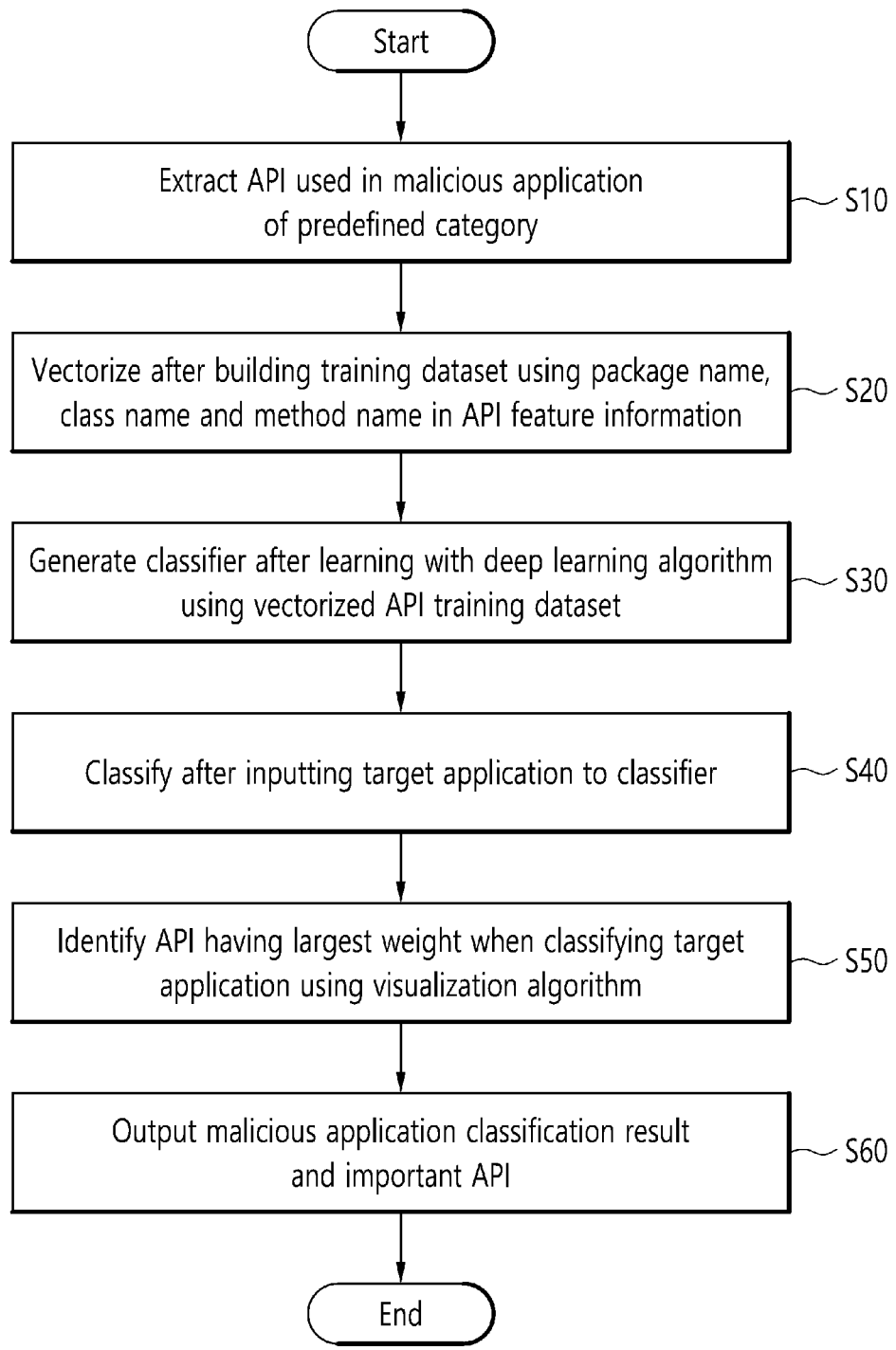
FIG. 9 is a flowchart of a mobile malicious code classification method based on feature selection according to an embodiment of the present disclosure.

FIG. 9 is a flowchart of a mobile malicious code classification method based on feature selection according to an embodiment of the present disclosure.

The mobile malicious code classification method based on feature selection according to this embodiment may be performed in substantially the same configuration as the device 10 of FIGS. 1 and 2. Accordingly, the same element as the device 10 of FIGS. 1 and 2 is given the same reference sign, and a repetitive description is omitted herein.

Additionally, the mobile malicious code classification method based on feature selection according to this embodiment may be performed by the software (application) for performing mobile malicious code classification based on feature selection.

The mobile malicious code classification method based on feature selection according to the present disclosure detects the features of malicious applications based on APIs of applications.

API is the acronym of Application Programming Interface and describes actual functional features of applications, which makes it possible to classify based on actual behaviors. Additionally, it is possible to extract using only applications without reliance on vaccine programs, thereby increasing the range of classifiable applications.

Additionally, it is not only possible to classify malicious and benign but also provide information about behaviors of applications by providing 71 categories together with APIs that significantly affect classification.

For malicious application feature detection based on API, each API feature information used in malicious applications of predefined categories is extracted. A training dataset is built with package name, class name and method name in the extracted API feature information.

Subsequently, the training dataset is vectorized for input to a deep learning algorithm and inputted to the deep learning algorithm to perform learning. When the learning is completed, important APIs are identified using a visualization algorithm such as Local Interpretable Model-Agnostic Explanation (LIME) and provided to a classifier together with the classification result.

Referring to FIG. 9, the mobile malicious code classification method based on feature selection according to this embodiment includes extracting API feature information including a package name, a class name, a method name and a description from a malicious application of a predefined category (S10).

A training dataset generated using the package name, the class name and the method name in the API feature information is vectorized for deep learning (S20).

The step of vectorizing may include building the training dataset with APIs extracted from each application for each category, and vectorizing the APIs to use the training dataset as an input value of the deep learning algorithm.

A classifier is generated by learning the vectorized training dataset (S30).

Probabilistic classification is performed to fit a target malicious application into a category (S40). The step of classifying may include assigning a probability for each category to fit the target malicious application into a category.

In an embodiment, the present disclosure identifies AP having a largest weight when classifying a target application using the visualization algorithm (S50), and defines the category of the target malicious application and outputs a classification important API using the classification result (S60).

The step of outputting the classification important API may include determining a category corresponding to a value that is larger than a preset threshold among each category probability for the target malicious application as a feature of the target malicious application, and outputting a preset number of APIs having the greatest influence when the target malicious application is assigned with probabilities by the classifier.

According to the mobile malicious code classification method based on feature selection of the present disclosure, it is possible to classify the categories of malicious applications and obtain important APIs using the deep learning algorithm after identifying the actual behaviors of the malicious applications using APIs responsible for actual functions of applications. Accordingly, it is possible to identify the detailed features of malicious applications, and it is expected to deal with the malicious behaviors quickly using them and prevent damage caused by the malicious behaviors.

The mobile malicious code classification method based on feature selection may be implemented in the form of applications or program instructions that can be executed through a variety of computer components, and recorded in computer-readable recording media. The computer-readable recording media may include program instructions, data files and data structures, alone or in combination.

The program instructions recorded in the computer-readable recording media may be specially designed and configured for the present disclosure and may be those known and available to persons having ordinary skill in the field of computer software.

Examples of the computer-readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure has been hereinabove described with reference to the embodiments, those skilled in the art will understand that various modifications and changes may be made thereto without departing from the spirit and scope of the present disclosure defined in the appended claims.

INDUSTRIAL APPLICABILITY

With the advent of Internet of Things (IoT) era in which data is transmitted and received between things connected via an Internet, devices are connected to one another and generate and share information. In particular, with the advent of the era of massive IoT in which a larger number of devices are connected with the help of 5G technology, security of connected devices is considered as important. The security of mobile devices occupying most of connected devices becomes important. Furthermore, with the growing impacts of mobile applications due to user centered services, there is a notable increase in malicious applications that steal and misuse sensitive information of users using mobile applications. When mobile devices are exposed to malicious behaviors, since many devices are connected, great damage will occur. Accordingly, it is necessary to accurately detect malicious behaviors before, and as new malicious applications increase, in some cases, it is difficult to detect malicious applications by simply classifying them.

To solve this problem, the present disclosure proposes an approach to detect malicious applications using deep learning based on APIs used to implement the functions of applications and classify the corresponding malicious applications each behavior, and also provides the decision basis of the proposed model through the visualization technique. As a result of experiment, it is possible to classify more elaborately than the existing machine learning classification methods and classify a larger number of applications than the existing AV report-based methods. Accordingly, when detailed category information of malicious applications is identified through the present disclosure, it is expected to deal with malicious behaviors more quickly.

DETAILED DESCRIPTION OF MAIN ELEMENTS

10: Mobile malicious code classification device based on feature selection
110: API extractor
130: API vectorizer
150: Learner
170: Classifier
190: Feature identifier
131: Training dataset generator
133: API word embedding
171: Probability evaluator
191: Decision maker
193: Important API identifier

The invention claimed is:

1. A mobile malicious code classification method based on feature selection, the method comprising:
extracting Application Programming Interface (API) feature information including a package name, a class name, a method name, and a description from a malicious application of a predefined category;
vectorizing a training dataset generated using the package name, the class name, and the method name in the API feature information for deep learning;
learning the vectorized training dataset to generate a classifier;
classifying a target malicious application into a category of malicious application based on probability of fit; and
defining the category of the target malicious application using a result of the classifying and outputting a classification important API.

2. The mobile malicious code classification method of claim 1, wherein the vectorizing comprises:
constructing the training dataset with a plurality of APIs extracted from a malicious application for each category of malicious application; and
vectorizing the plurality of APIs to use the training dataset as an input value of a deep learning algorithm.

3. The mobile malicious code classification method of claim 1, wherein the classifying comprises assigning, by the classifier, a probability of fitting the target malicious application into the category for each category of malicious application.

4. The mobile malicious code classification method of claim 3, wherein the outputting the classification important API comprises:
determining for the target application the category corresponding to a probability value that is larger than a preset threshold among the assigned probabilities for the each category of malicious application as a feature of the target malicious application; and
outputting a preset number of APIs having a greatest influence when the target malicious application is assigned with the probabilities for the each category of malicious application by the classifier.

5. A non-transitory computer-readable storage medium having recorded thereon a computer program for performing a mobile malicious code classification method based on feature selection, the method comprising:
extracting Application Programming Interface (API) feature information including a package name, a class name, a method name, and a description from a malicious application of a predefined category;
vectorizing a training dataset generated using the package name, the class name, and the method name in the API feature information for deep learning;
generating a classifier by learning the vectorized training dataset;
classifying a target malicious application into a category of malicious application based on probability of fit; and
defining the category of the target malicious application using a result of the classifying and outputting a classification important API.

6. A mobile malicious code classification device based on feature selection, the device comprising:
an Application Programming Interface (API) extractor extracting API feature information including a package name, a class name, a method name, and a description from a malicious application of a predefined category;
an API vectorizer vectorizing a training dataset generated using the package name, the class name, and the method name in the API feature information for deep learning;
a learner learning the vectorized training dataset to generate a classifier;
a classifier classifying a target malicious application into a category of malicious application based on probability of fit; and
a feature identifier defining the category of the target malicious application using a result of the classifying and outputting a classification important API.

7. The mobile malicious code classification device of claim 6, wherein the API vectorizer comprises:
a training dataset generator constructing the training dataset with a plurality of APIs extracted from a malicious application for each category of malicious application; and
an API word embedder vectorizing the plurality of APIs to use the training dataset as an input value of a deep learning algorithm.

8. The mobile malicious code classification device of claim 6, wherein the classifier comprises a probability evaluator assigning a probability of fitting the target malicious application into the category for each category of malicious application.

9. The mobile malicious code classification device of claim 8, wherein the feature identifier comprises:
a decision maker determining for the target malicious application, as a feature of the target malicious application, the category corresponding to a probability value that is larger than a preset threshold among the assigned probabilities for the each category of malicious application; and
an important API identifier outputting a preset number of APIs having a greatest influence when the target malicious application is assigned with the probabilities for the each category of malicious application by the classifier.

\* \* \* \* \*